(12) United States Patent
Foreman et al.

(10) Patent No.: US 9,802,743 B2
(45) Date of Patent: Oct. 31, 2017

(54) HIGH STRENGTH BLIND INSTALLATION HOSE AND CABLE CLAMP RETAINER

(71) Applicant: RL Hudson & Company, Broken Arrow, OK (US)

(72) Inventors: Benny R. Foreman, Broken Arrow, OK (US); Adam Jeffrey Tilman, Broken Arrow, OK (US)

(73) Assignee: RL Hudson & Company, Broken Arrow, OK (US)

( * ) Notice: Subject to any disclaimer, the term of this patent is extended or adjusted under 35 U.S.C. 154(b) by 0 days.

(21) Appl. No.: 14/794,962

(22) Filed: Jul. 9, 2015

(65) Prior Publication Data

US 2016/0001945 A1   Jan. 7, 2016

Related U.S. Application Data

(63) Continuation-in-part of application No. 14/264,737, filed on Apr. 29, 2014, now Pat. No. 9,121,528.

(51) Int. Cl.
| | |
|---|---|
| *B65D 63/10* | (2006.01) |
| *F16L 3/233* | (2006.01) |
| *F16L 3/22* | (2006.01) |
| *F16B 5/06* | (2006.01) |

(52) U.S. Cl.
CPC ..... *B65D 63/1072* (2013.01); *B65D 63/1063* (2013.01); *F16L 3/222* (2013.01);
(Continued)

(58) Field of Classification Search
CPC ......... B65D 2563/108; B65D 63/1063; B65D 63/1072; F16L 3/222; F16L 3/2334; Y10T 24/1498
See application file for complete search history.

(56) References Cited

U.S. PATENT DOCUMENTS

| 69,120 A | * | 9/1867 | Paine | ...................... F16L 3/233 |
| | | | | 24/25 |
| 3,144,695 A | * | 8/1964 | Budwig | .................. F16L 3/137 |
| | | | | 24/16 PB |

(Continued)

FOREIGN PATENT DOCUMENTS

| EP | 0602548 B1 | 8/1997 |
| EP | 1462699 A1 | 9/2004 |

(Continued)

OTHER PUBLICATIONS

Product page for Fir Tree Push Mount, HellermannTyton, available at http://www.hellermanntyton.us/ProductDetail.aspx?p=157-00108. Publication date unknown but admitted as prior art.

(Continued)

*Primary Examiner* — David Upchurch
(74) *Attorney, Agent, or Firm* — Gable Gotwals; David G. Woodral

(57) ABSTRACT

A retainer has a first ratcheting receiver that engages a strap in a one way ratcheting relationship that allows a free end of the strap to be passed through the first ratcheting receiver and a shank to be thereby pulled toward the first ratcheting receiver but not drawn away therefrom. The first ratcheting receiver backs an extension post protruding from the retainer such that the shank is sized to pass through an opening in a wall but is prevented from being withdrawn from the opening when the retainer is urged against the wall such that the extension post occupies at least a portion of the opening. A second ratcheting receiver is affixed to the retainer and receives the free end of the strap for securing a load to the retainer after the shank has been urged toward the first ratcheting receiver to secure the retainer to the wall.

8 Claims, 14 Drawing Sheets

(52) U.S. Cl.
CPC ...... *F16L 3/2334* (2013.01); *B65D 2563/108* (2013.01); *F16B 5/0685* (2013.01); *Y10T 24/1498* (2015.01)

(56) References Cited

U.S. PATENT DOCUMENTS

| | | | | |
|---|---|---|---|---|
| 3,149,808 | A * | 9/1964 | Weckesser | F16L 3/233 24/16 PB |
| 3,550,219 | A * | 12/1970 | Van Buren, Jr. | F16B 21/075 248/73 |
| 3,632,069 | A * | 1/1972 | Thayer | H02G 3/32 248/56 |
| 3,632,071 | A | 1/1972 | Cameron et al. | |
| 5,088,158 | A * | 2/1992 | Burkholder | E05B 75/00 128/879 |
| 5,304,188 | A | 4/1994 | Marogil | |
| 5,337,983 | A | 8/1994 | mailey | |
| 5,653,409 | A | 8/1997 | White, Jr. et al. | |
| 5,759,004 | A * | 6/1998 | Kuffel | H02G 3/30 24/295 |
| D417,142 | S * | 11/1999 | Kim | D8/382 |
| D417,838 | S * | 12/1999 | Kim | D8/382 |
| 6,105,908 | A * | 8/2000 | Kraus | F16L 3/137 24/16 PB |
| 6,190,083 | B1 | 2/2001 | Winton, III | |
| 6,347,435 | B1 * | 2/2002 | Davignon | B65D 63/1063 24/16 PB |
| 6,533,226 | B2 | 3/2003 | Geiger | |
| 6,588,169 | B2 | 7/2003 | Sarver | |
| 6,592,083 | B1 | 7/2003 | Hobson et al. | |
| 6,704,972 | B2 * | 3/2004 | Pyle | B65D 63/1072 24/16 PB |
| 7,083,152 | B2 | 8/2006 | Carullo et al. | |
| 7,322,548 | B2 * | 1/2008 | Mielke | F16L 3/137 24/16 PB |
| 7,360,281 | B1 * | 4/2008 | MacCartey | B65D 63/1063 24/16 PB |
| 7,503,528 | B2 | 3/2009 | Adams et al. | |
| 7,594,629 | B2 * | 9/2009 | Smutny | H02G 3/30 248/71 |
| 7,621,100 | B2 * | 11/2009 | Kufner | E04F 13/0892 33/526 |
| 7,861,487 | B2 * | 1/2011 | Kufner | E04F 21/0092 33/526 |
| 7,861,981 | B2 * | 1/2011 | Olver | F16L 3/137 24/16 PB |
| 7,931,241 | B2 | 4/2011 | Logan et al. | |
| 8,028,962 | B2 | 10/2011 | Geiger | |
| 8,079,199 | B1 * | 12/2011 | Kufner | E04F 13/0892 33/526 |
| 2008/0189916 | A1 * | 8/2008 | Geiger | F16L 3/2332 24/16 R |
| 2010/0186197 | A1 * | 7/2010 | Inomata | B60R 16/0215 24/16 R |
| 2010/0306967 | A1 | 12/2010 | Geiger | |

FOREIGN PATENT DOCUMENTS

| | | |
|---|---|---|
| EP | 1887232 A3 | 2/2008 |
| EP | 1342672 B1 | 5/2013 |

OTHER PUBLICATIONS

Product page for Cable Tie and Edge Clip, HellermannTyton, available at http://www.hellermanntyton.us/ProductDetail.aspx?p=156-00864. Publication date unknown but admitted as prior art.

Product page for Push Mount Cable Tie, Micro Plastics Inc., available at http://secure.microplastics.com/detail.aspx?fam=12&part=215&sec=%ED%81%8E%E7%89%92%E9%87%98%EA%BC%9E%EA%B1%B5%E4%B6%9E%E4%81%BD%EE%B4%96. Publication date unknown but admitted as prior art.

Product page for Wing Mount Cable Tie, Micro Plastics, Inc., available at https://secure.microplastics.com/detail.aspx?fam=12&part=277&sec=%E0%AB%91%E3%94%B1%EA%A5%98%E1%B7%95%E8%B0%95%EF%AB%BF%EC%A4%87%EE%8D%90. Publication date unknown but admitted as prior art.

Product page for Screw Mount Cable Ties, Micro Plastics, Inc., available at https://secure.microplastics.com/detail.aspx?fam=12&part=219&sec=%DA%8B%EE%97%AF%E5%B0%8E%D5%A7%EB%90%BD%E9%BE%80%E9%B7%9F%EF%BE%B4. Publication date unknown but admitted as prior art.

Product page for Ladder Style Adjustable Cable Clamp, Micro Plastics, Inc., available at https://secure.microplastics.com/detail.aspx?fam=12&part=280&sec=%ED%9D%AB%EF%8F%A9%E6%8C%9F%E5%BD%A8%E5%8B%B1%E8%A8%B4%EC%80%AA%E4%87%8A. Publication date unknown but admitted as prior art.

Product page for Quick Cable Clamps, Micro Plastics, Inc., available at https://secure.microplastics.com/detail.aspx?fam=11&part=153&sec=%E7%83%83%E4%89%9D%E3%B2%8B%E9%87%8F%E4%8E%AF%D2%89%EC%A4%8B%E5%B1%9D. Publication date unknown but admitted as prior art.

Product page for Wire-Tube Retaining Straps, Micro Plastics, Inc., available at https://secure.microplastics.com/detail.aspx?fam=11&part=250&sec=%EA%B3%9B%EF%BF%BD%E4%80%B2%EF%80%9B%E1%A9%8E%E7%A4%95%EB%98%AB%E8%9E%A2. Publication date unknown but admitted as prior art.

Product page for EZ Twist Lock with Arm, Micro Plastics, Inc., available at https://secure.microplastics.com/detail.aspx?fam=11&part=316&sec=%E3%A9%87%EA%A0%BB%EE%A3%BF%E6%83%BA%E5%AA%9E%E3%9D%8E%E9%BB%A5%E9%95%86. Publication date unknown but admitted as prior art.

Product page for Cord Clip with Push Mount, Micro Plastics, Inc., available at https://secure.microplastics.com/detail.aspx?fam=11&part=270&sec=%E5%8F%85%E2%AE%9A%E9%BE%8C%E6%8C%88%E7%B3%A8%EC%BC%84%E5%90%B8%EB%8C%BD. Publication date unknown but admitted as prior art.

Product page for Push Tie Mount, Micro Plastics, Inc., available at https://secure.microplastics.com/detail.aspx?fam=12&part=275&sec=%E6%AE%8D%E8%A8%93%EE%B2%B4%E9%9D%86%E2%9F%86%E2%88%84%E3%81%BF%E7%BA%80. Publication date unknown but admitted as prior art.

Product page for Cable Tie Holder, Micro Plastics, Inc., available at https://secure.microplastics.com/detail.aspx?fam=11&part=14&sec=%E5%BB%A4%E1%B9%9A%E1%A5%8E%ED%86%A8%E5%B9%A1%EB%9A%A4%E2%9C%B0%EE%B3%99. Publication date unknown but admitted as prior art.

Product page for Flat Cable Clamp, Micro Plastics, Inc., available at https://secure.microplastics.com/detail.aspx?fam=12&part=278&sec=%EE%A7%9D%E4%AC%83%E1%9E%95%EF%8C%A8%E7%A3%82%EF%A6%BD%E9%97%A0%EF%BF%BD. Publication date unknown but admitted as prior art.

* cited by examiner

HIGH STRENGTH BLIND INSTALLATION HOSE AND CABLE CLAMP RETAINER

CROSS-REFERENCE TO RELATED CASES

This application is a Continuation-in-Part of U.S. Utility patent application Ser. No. 14/264,737, entitled "HIGH STRENGTH BLIND INSTALLATION HOSE AND CABLE CLAMP RETAINER," filed Apr. 29, 2014, which claims the priority of U.S. provisional patent application Ser. No. 61/818,189, entitled "HIGH STRENGTH BLIND INSTALLATION HOSE AND CABLE CLAMP RETAINER," filed on May 1, 2013, the contents of both of which are hereby incorporated by reference.

FIELD OF THE INVENTION

The present invention relates generally to the field of fasteners and, more particularly, to the field of anchored retention straps.

BACKGROUND OF THE INVENTION

The construction and assembly of heavy equipment, industrial machines, and other assemblies often requires the mounting and routing of a large amount of cables, wires, and other signal, fluid, and/or air-carrying components. Such wires, cables, and other conduits may need to be routed in a precise fashion relative to the rest of the installation in order to avoid damage and insure that the final installation is serviceable and meets all job requirements.

One previous solution to these issues was to utilize "Christmas tree" or snap in retainers. However, these lack the strength needed to support heavy loads. They may break or pull out of mounting holes over time. Further, because of the snap fit construction, they are prone to breakage during installation. The size and depth of the mounting hole for a snap fit device is also of high importance, leading to a large number of retainer shapes and sizes being needed to complete installations where varying panel thickness may be encountered.

Some heavy equipment OEMs that require more robust mounting use "weld links" to provide a mounting point for a standard cable tie. This link is welded to the panel and is therefore essentially a permanent installation that takes a skilled craftsman to apply. Moreover, their installation can be time consuming as they must be located and oriented correctly for use.

What is needed is a system for addressing the above and related issues.

SUMMARY OF THE INVENTION

The invention of the present disclosure, in one aspect thereof, comprises an attachment system having a strap with a shank and a free end interposed by a medial portion. A retainer has a first ratcheting receiver that engages the strap in a one way ratcheting relationship that allows the free end of the strap to be passed through the first ratcheting receiver and the shank to be thereby pulled toward the first ratcheting receiver but not drawn away therefrom. The first ratcheting receiver backs an extension post protruding from the retainer such that the shank is sized to pass through an opening in a wall but is prevented from being withdrawn from the opening when the retainer is urged against the wall such that the extension post occupies at least a portion of the opening. A second ratcheting receiver is affixed to the retainer and receives the free end of the strap for securing a load to the retainer after the shank has been urged toward the first ratcheting receiver to secure the retainer to the wall.

In some embodiments, the first ratcheting receiver and the second ratcheting receiver operate in substantially the same direction. The second ratcheting receiver may be defined as passing through a flange surrounding the first ratcheting receiver. The flange may provide a cable pad for locating a load to be secured by the strap. A relief may be defined in the cable pad to allow the strap to pass from the first ratcheting receiver to the second ratcheting receiver. The first and second ratcheting receivers may each include an internal pawl that abuts the medial portion of the strap when inserted therein and allows slippage of the strap only in one direction.

In some embodiments, the extension post comprises two post segments separated by a cleft. The first ratcheting receiver may be located such that the shank is drawn into the cleft between the post when the strap is drawn through the first ratcheting receiver. The shank may comprise a pair of lateral protrusions facing opposite directions between the post segments.

The invention of the present disclosure, in another embodiment thereof, comprises a system having a first ratcheting receiver defined within a flange of a retainer to allow a strap to be moved or pulled therethrough in a first direction but to resist movement or pulling of the strap in an opposite direction. The system has a segmented extension post with a cleft defined between two segments, the cleft leading to the first ratcheting receiver such that the strap may be drawn into the cleft but not retracted therefrom. A shank on an end of the strap is sized to fit partially into the cleft with protrusions extending laterally from the cleft when the shank is situated therein.

A medial portion of the strap may be provided with teeth that cooperate with separate teeth defined on a pawl internal to the first ratcheting receiver such that movement of the strap through the first ratcheting receiver is allowed in only a single direction. The system may include a second ratcheting receiver defined in the flange that allows the strap to pass therethrough only in one direction for securing a load to the retainer. A load pad defined by the flange and a relief cutout may be defined in the load pad providing access to the second ratcheting receiver.

The first and second ratcheting receivers may face substantially the same direction and may be defined at a predetermined angle offset relative to a direction faced by the extension post.

The invention of the present disclosure, in another aspect thereof, comprises a method of affixing a load to a wall including placing a free end of a strap through a first ratcheting receiver defined through a flange of a retainer, the first ratcheting receiver allowing the strap to be drawn therein only in one direction but not withdrawn in an opposite direction. The method includes placing a shank of the strap, defined on an end opposite the free end, through an oblong hole in the wall, placing a segmented extension post extending from the retainer proximate the first ratcheting receiver into the oblong hole, and drawing the shank against the wall by the free end of the strap and at least partially into a cleft in the segmented extension post. A load is secured to the retainer by wrapping the free end of the strap around the load and running the free end of the strap into a second ratcheting receiver defined in the retainer that does not allow the strap to be withdrawn.

DETAILED DESCRIPTION OF THE PREFERRED EMBODIMENTS

Figure 1:
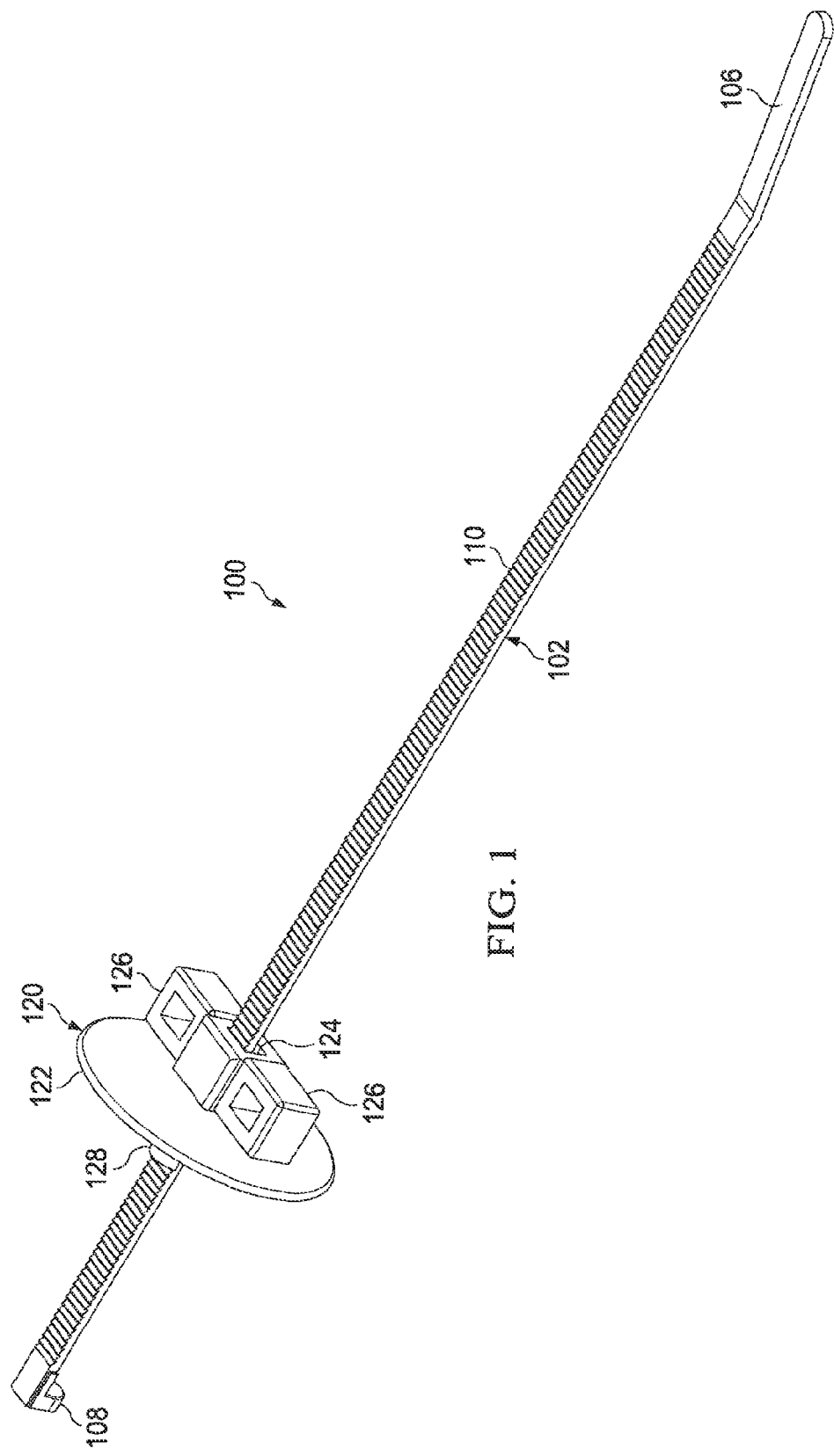
FIG. 1 is a perspective view of one embodiment of a high strength blind installation retainer system according to aspects of the present disclosure.
Figure 2:
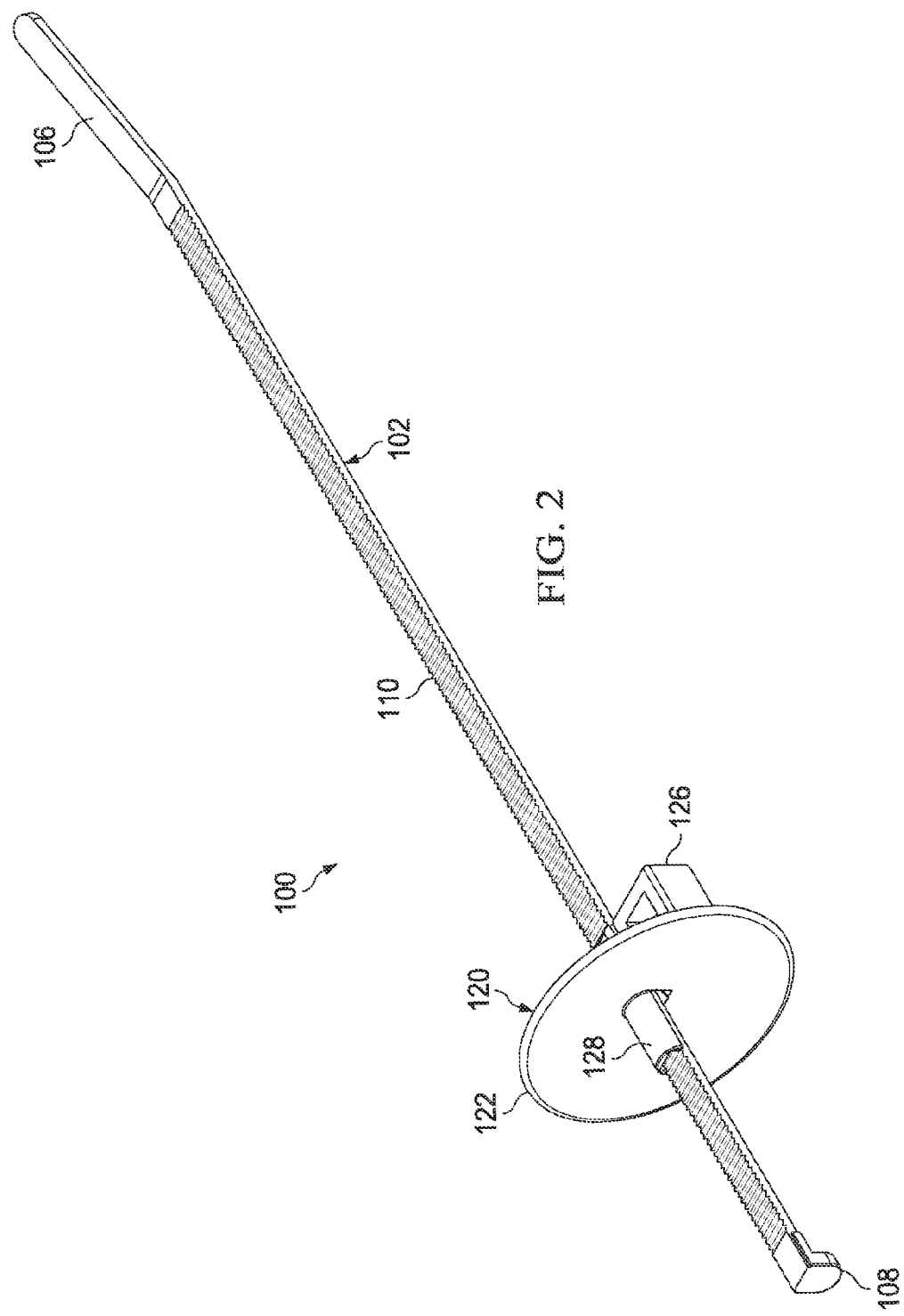
FIG. 2 is another perspective view of the system of FIG. 1.

Referring now to FIG. 1, a perspective view of one embodiment of a high strength blind installation retainer system 100 is shown. FIG. 2 is an illustration of the same system 100 from the opposite side. Taken together, FIGS. 1 and 2 illustrate the relationship between the major components of the system 100 as described herein. The present embodiment 100 is comprised of a strap 102 sliding within a retainer 120. The strap 102 may be a zip tie, cable tie, or other ratcheting strap that slides through the retainer 120 in only one direction (it could also be stated that the retainer 120 slides along the strap 102). In the present embodiment, the strap 102 comprises a medial portion 104 with a shank 108 at one end and an opposite free end 106. In the present embodiment, the retainer 120 is movable only towards the shank 108.

One function of the shank 108 is to create a point along the strap 102 that is wider than the remainder of the strap 102. In some embodiments, the shank 108 comprises a protrusion arranged orthogonally to the axis of the medial portion 104 of the strap 102. The shank 108 may have a square, circular, oblong, or other profile. In some embodiments, the shank 108 protrudes away from the axis of the strap 102 in a single direction, but in others it provides multiple lateral protrusions.

The retainer 120 comprises a flange 122 surrounding a ratcheting receiver 124. The receiver 124 cooperates with teeth 110 on the strap 102 to restrict movement between the retainer 120 and strap 102 such that the shank 108 cannot be pulled away from the retainer 120, but is allowed to move toward the retainer (e.g., by pulling on free end 106). To assemble the system 100 for installation, the free end 106 of the strap 102 may be placed through the primary ratcheting receiver 124 drawing the shank 108 toward the flange 122. As explained more fully below, prior to final installation of the system 100, the shank 108 should not be drawn completely to the flange 122.

The retainer 120 of the present embodiment provides a pair of secondary ratcheting receivers 126. In the present embodiment, when the system 100 has been mounted or installed, the free end 106 may be placed through either one or both or of the secondary ratcheting receivers 126 in order to secure an item in place against a wall. Items that may be retained include, but are not limited to, wires, conduits, hoses, and fluid supply lines. In one embodiment, the pair of secondary ratcheting receivers 126 are oriented to ratchet in opposite directions in order to provide for mounting options on either side of the primary ratcheting receiver 124.

Figure 3:
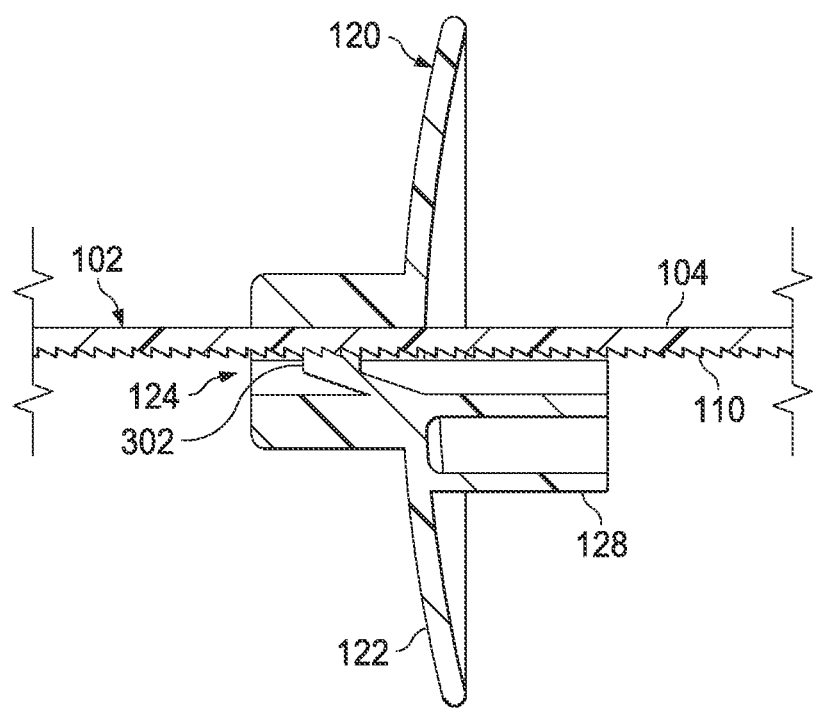
FIG. 3 is a side cutaway view of a retainer associated with the system of FIG. 1.

Referring now to FIG. 3, a side cutaway view of the retainer 120 is shown. It can be appreciated from the various views provided that the flange 122 may have a concave or disc-shaped form (uses for which will be explained more fully below). From FIG. 3 it can be seen that the primary ratcheting receiver 124 provides a pawl 302 that engages with teeth 110 on the strap 102 such that the strap 102 is allowed to proceed through the retainer 120 in only one direction. In the present embodiment, the teeth 110 are provided along only one side of the strap 102. However, in other embodiments, teeth 110 may be provided on a different surface or on multiple surfaces. Similarly, the pawl 302 may not be placed or formed within the ratcheting receiver 124 exactly as shown so long as it cooperates with the teeth 110 to provide the appropriate ratcheting function. An extension post 128 can be seen extending from the concave side of the flange 122. The present embodiment provides a shank 108 extending away from the side of the strap 102 that is against the extension post 128.

Figure 4:
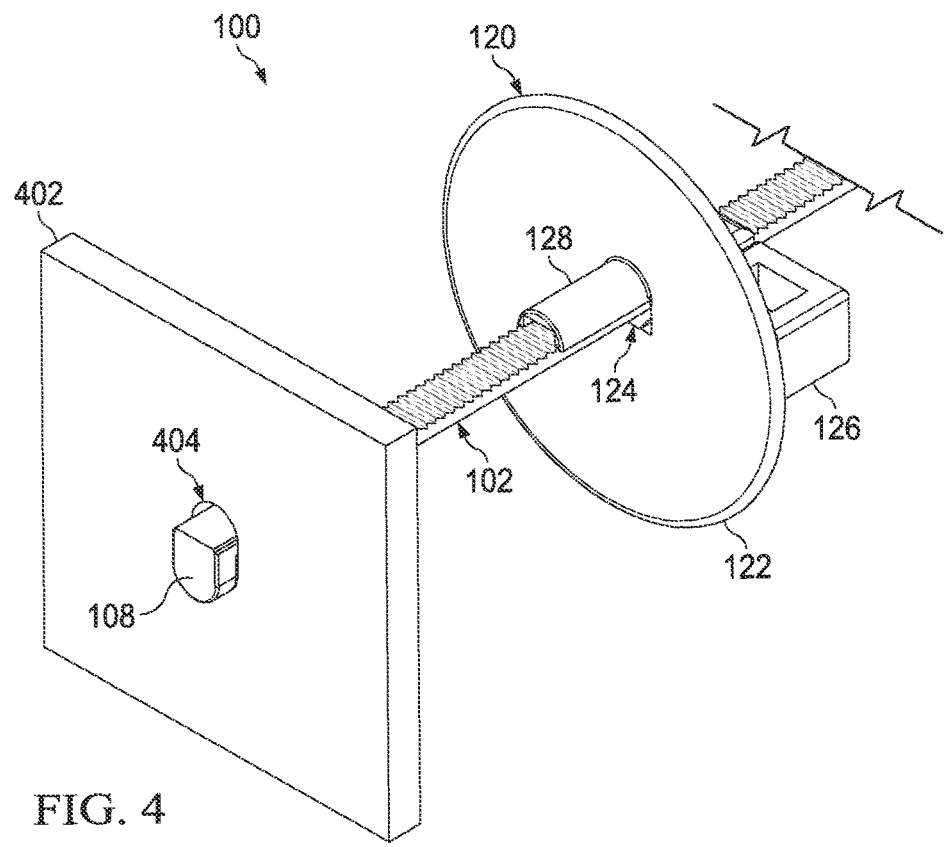
FIG. 4 is a perspective illustration of a blind installation of the system of FIG. 1 to a wall.

Referring now to FIG. 4, a perspective illustration of a blind installation of the system 100 of FIG. 1 is shown. Here, the system 100 is shown being installed into a panel or wall 402. The wall 402 may be a portion of any piece of equipment for which a reliable mounting location is needed. Only a portion of the wall 402 is shown in the viewpoint of FIG. 4 and it is understood that the user of the system 100 may not have ready access to both sides of the wall 402. Therefore, the installation may be referred to as a blind installation. Although the systems of the present embodiment are suitable for blind installation applications, it should be appreciated that they are not so limited and that any time a line, hose, or other conduit needs to be mounted to a surface, the systems of the present disclosure may be readily employed. The wall 402 also need not be perfectly flat.

In the present embodiment, the system 100 is installed onto the wall 402 utilizing an opening 404. The opening 404 may be made with a drill or punch or other implement. In the present embodiment, the opening 404 is substantially circular. However, as explained below, the shape of the opening 404 may differ. The size of the opening 404 should bear some relationship to the size and contour of the extension post 128 and/or shank 108. In the present embodiment, the extension post 128 has an outer contour approximating that of a solid semi-cylinder. The extension post 128 may provide a groove or recess along its length that allows the strap 102 and/or shank 108 to ride at least partially nested within the extension post 128 when the two are drawn together.

The shank 108 may be sized to fit easily through the opening 404 and may be hooked onto the rim of the hole or opening 404 as shown on the opposite side of the wall 402 from the retainer 120. The retainer 120 may then be urged forward toward the opening 404 such that the extension post 128 occupies a sufficient portion of the opening 404 that is not occupied by the strap 102 and that the combination of the shank 108 and extension post 128 cannot be withdrawn through the opening 404. The ratcheting relationship between the retainer 120 and the strap 102, also prevents the extension post 128 from being pulled back out of the opening 404, which could allow the system 100 to become separated from the wall 402.

Figure 5:
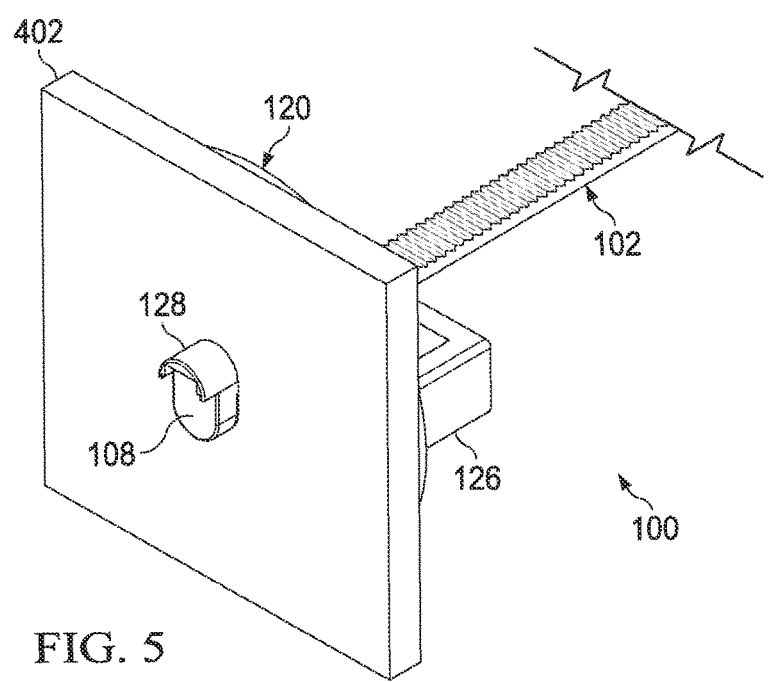
FIG. 5 is another perspective illustration of the installation of FIG. 4 showing a retainer shank abutting a wall.

FIG. 5 illustrates the completed installation of the system 100 with the extension post 128 and the portion of the strap 102 adjacent to the shank 108 occupying all or most of the opening 404. Recall that, due to the ratcheting mechanism of the primary ratcheting receiver 124 and the strap 102, the retainer 120 cannot be drawn away from the wall 402 nor can the shank 108 be pulled away from the retainer 120.

In the present embodiment, the retainer 120 and strap 102 comprise polymers but other materials are possible. Depending upon the strength of the materials employed, and the composition of the wall 402, the shank 108 need not be excessively wide. Of course, an upper limit is the size of the opening 404 through which the shank 108 must pass for installation.

It should be appreciated now that the strap 102 and extension post 128 could be moved from the opening 404 just as they were inserted. However, the shank 108 cannot clear the opening 404 when the extension post 128 occupies the opening 404. Given the relationship between the extension post 128, strap 102, and shank 108, so long as the extension post 128 extends all the way, or nearly all the way, through the opening 404, a large variation in the thickness of the wall 402 can be tolerated. Although having a wall with a thickness greater than the length of the extension post 128 could allow the shank 108 to retreat medially into the opening 404 and dislodge the system 100, excessive length of the extension post 128 beyond the thickness of the wall 402 is not problematic.

The materials comprising the retainer 120 may be flexible to the extent that the concave shape of the flange 122 may be used to provide a preload or static tension between the shank 108 and the flange 122 on opposite sides of the wall 402. As previously described, once the installation of the system 100 is complete, the free end 106 of the strap 102 may be used along with one or both of the secondary ratcheting receivers 126 to secure loads or items to the wall 402.

As illustrated, the system 100 (and others of the present disclosure) provide a mechanism for performing a blind installation of a retainer system onto a wall 402 or other surface. When installation of the system 100 is complete, depending upon the tolerances of the various components and the opening 404, the retainer 120 may still be rotatable to provide for optimum angle of the secondary ratcheting receivers 126 to find the most utility. It will also be appreciated that, in the event that an excessive amount of strap 102 remains following its use (whether with the secondary ratcheting receivers 126 or otherwise), any unneeded remainder may be cutaway.

Figure 6:
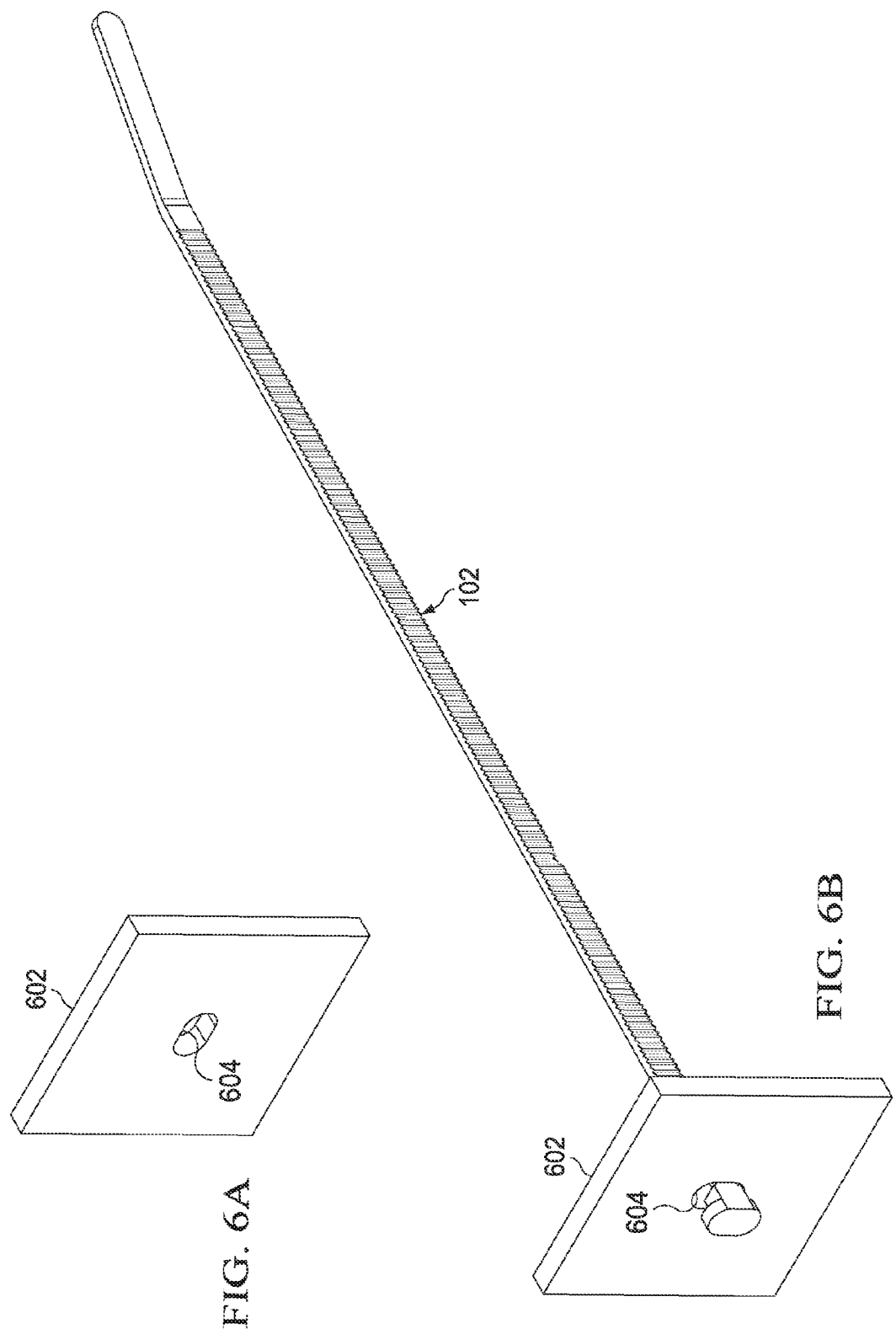
FIG. 6A is a perspective view of a slotted opening in a wall.
FIG. 6B is another perspective illustration of a blind installation of another retainer system into the wall of FIG. 6A according to aspects of the present disclosure.
Figure 7:
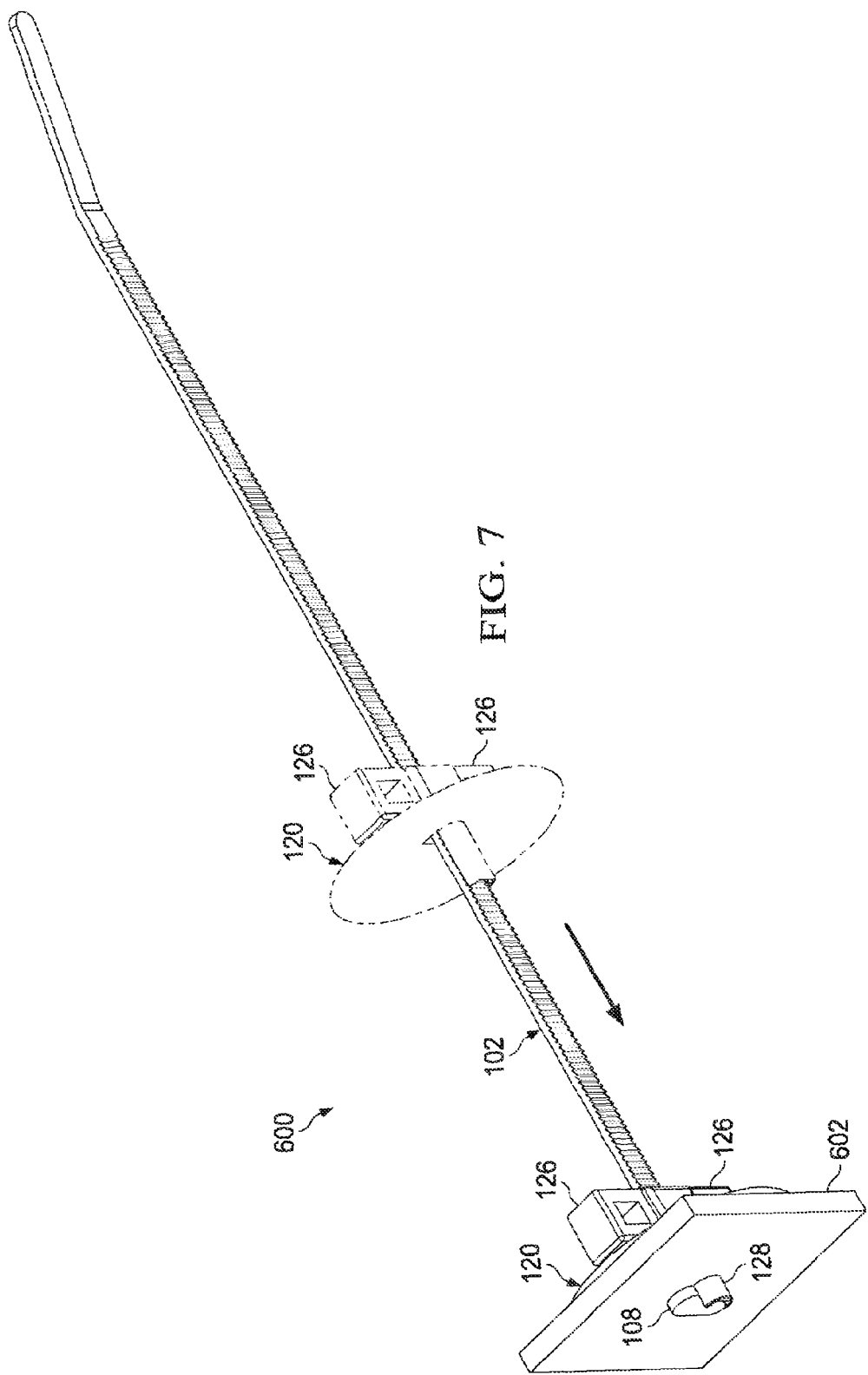
FIG. 7 is another perspective illustration of the installation of FIG. 5.

Referring now to FIGS. 6A, 6B, and 7, a perspective illustration of another embodiment of a high strength blind installation retainer system 600 is shown. FIG. 6A illustrates a panel or wall 602 provided with a slotted hole or slotted opening 604. The retainer system 600 (shown completed in FIG. 7) may be substantially identical to the system 100 of FIG. 1 with the exception of the configuration of the shank 608. Where a slotted hole 602 is utilized, the shank 608 may have a corresponding oblong shape. Therefore, the shank 608 may be insertable through the opening 604 only when turned in a particular orientation(s).

In the present embodiment, the shank 608 may be rotated to allow insertion into the opening 602 and then rotated approximately 90° about its axis such that the strap 102 cannot be withdrawn back through the opening 602. As shown in FIG. 7, the installation may be completed by attachment of the retainer 120. As with previous embodiments, the extension post 128 serves to fill the remainder of the opening 602 that is not already occupied by the portion of the strap 102 adjacent to the shank 608. Given the manner in which the strap 102 and extension post 128 occupy the slotted opening 602, the orientation of the retainer 120 and the associated secondary ratcheting receivers 126 may remain in whatever angular orientation with respect to the wall 604 in which they are installed. As before, the retainer 120 and strap 102 may be drawn tightly against opposite sides of the wall 600 to provide a preloading effect of the retainer 120. The strap 102 and, particularly the free end 106, may be utilized in conjunction with the secondary ratcheting receivers 126 to secure cables or other items, and/or the excess of the strap 102 may be removed.

Figure 8:
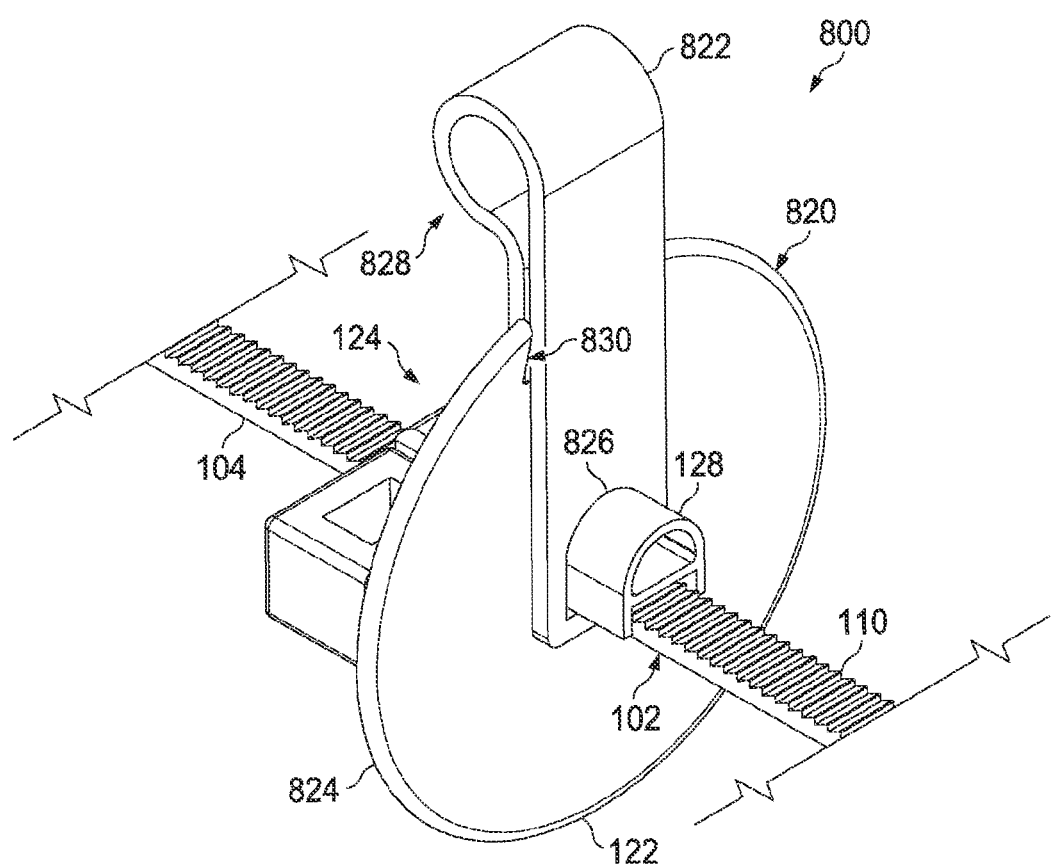
FIG. 8 is perspective view of another embodiment of a high strength blind installation retainer system according to aspects of the present disclosure.
Figure 9:
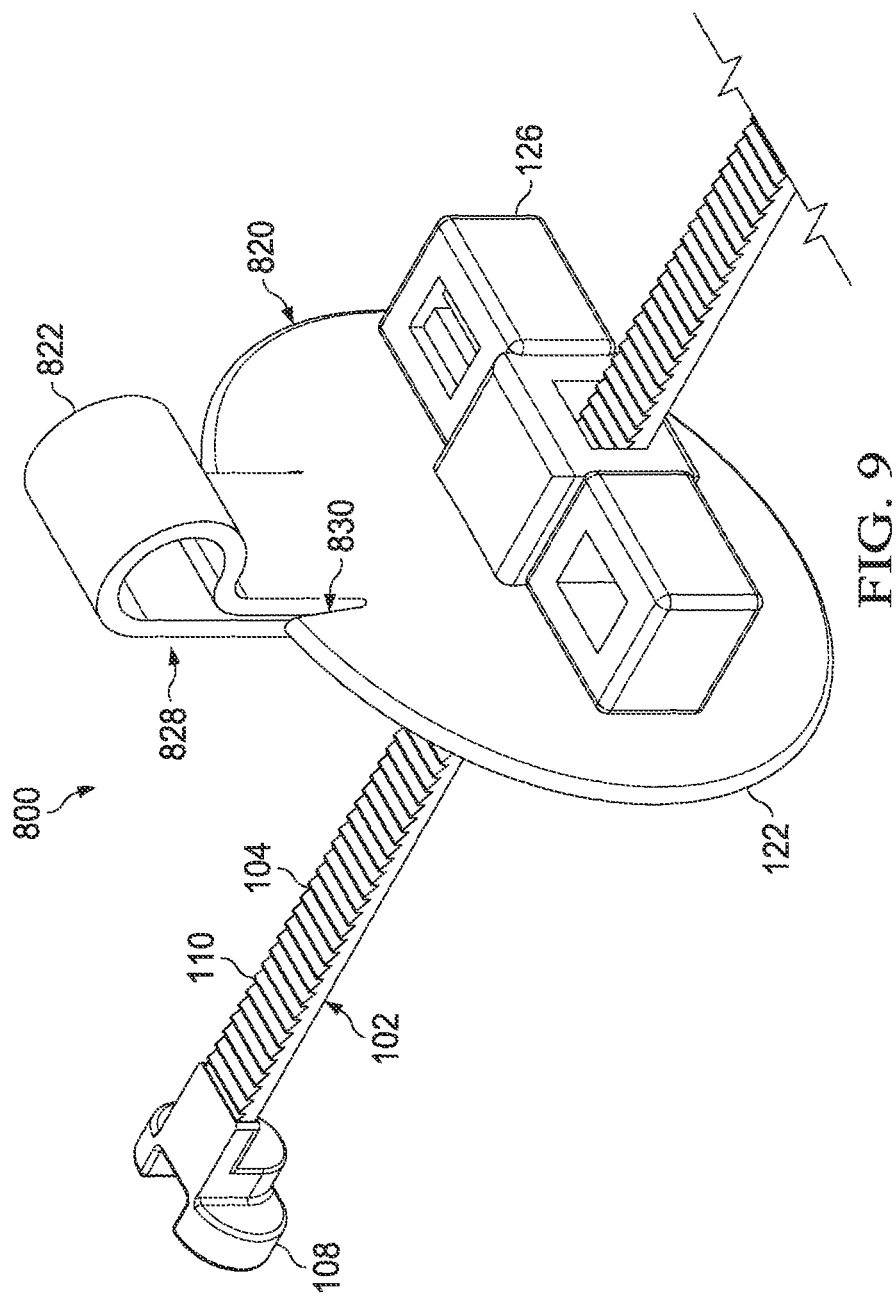
FIG. 9 is another perspective view of the system of FIG. 8.

Referring now to FIGS. 8 and 9, a perspective view of another embodiment of a high strength blind installation retainer system 800 is shown. The present embodiment is also suitable for mounting with slotted holes as discussed above. However, it will be appreciated that the size and contour of the extension post 128 and/or shank 108 could be modified to allow for installation into a round hole or opening. The strap 102 of the present embodiment is substantially similar to those discussed above. Teeth 110 covering all or a portion of length of the strap 102.

In the present embodiment, a retainer 820 provides a loop of material 822 that proceeds from a flange 122 and creates a passageway 828. A free end 824 of the loop 822 may have an opening 826 defined therein that is sized and shaped to pass over and around the extension post 128 and the strap 102. The materials comprising the retainer 820 and the loop 822 may be flexible (e.g., polymers) such that the free end 824 may be removed from the extension post 128 to allow a wire, hose, conduit, or other load to be placed in the passageway 828. The free end 824 may then be replaced onto the extension post 128 and the system 800 installed onto a wall or other surface as previously described. In the present embodiment, relief passages 830 are cut in the flange 122 to allow the flange 122 to fit flush against a wall or panel even while utilizing the loop 822 and passageway 828. The utility of the additional passageway 828 is in addition to the options that are provided by the secondary ratcheting receivers 126 for using the strap 128 to secure loads to the wall following installation of the retainer system 800. In another embodiment, the loop 822 may be provided as a separate component (e.g., not formed with the flange 122) providing a secure passageway 828, and may be installed onto the extension post 128 only in applications where needed.

Figure 10:
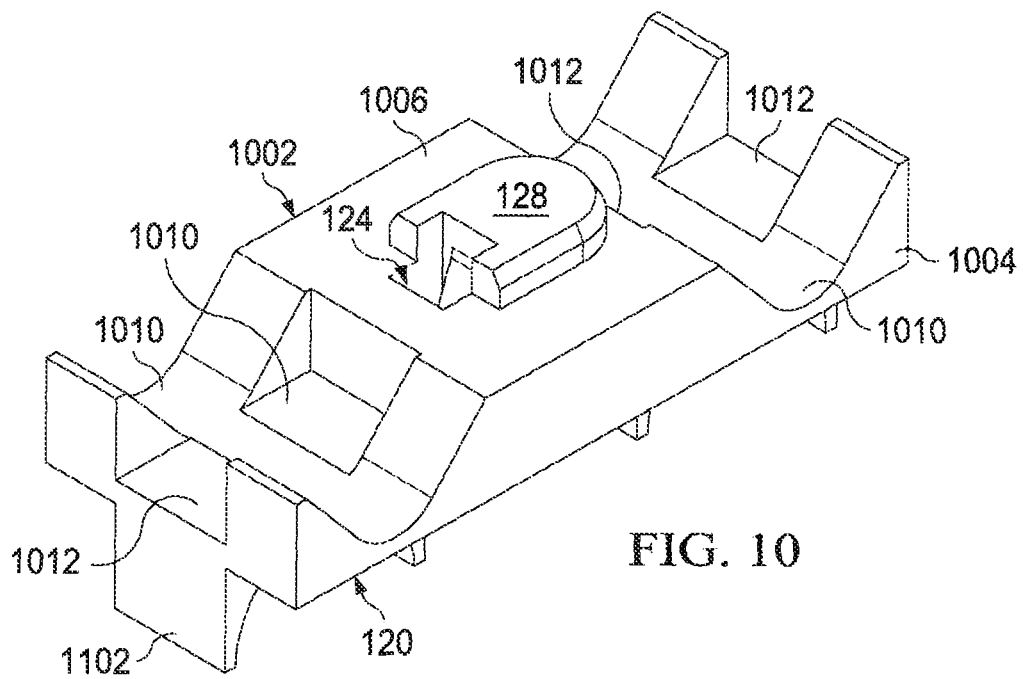
FIG. 10 is a perspective view of a flange associated with another embodiment of a high strength blind installation retainer system according to aspects of the present disclosure.
Figure 11:
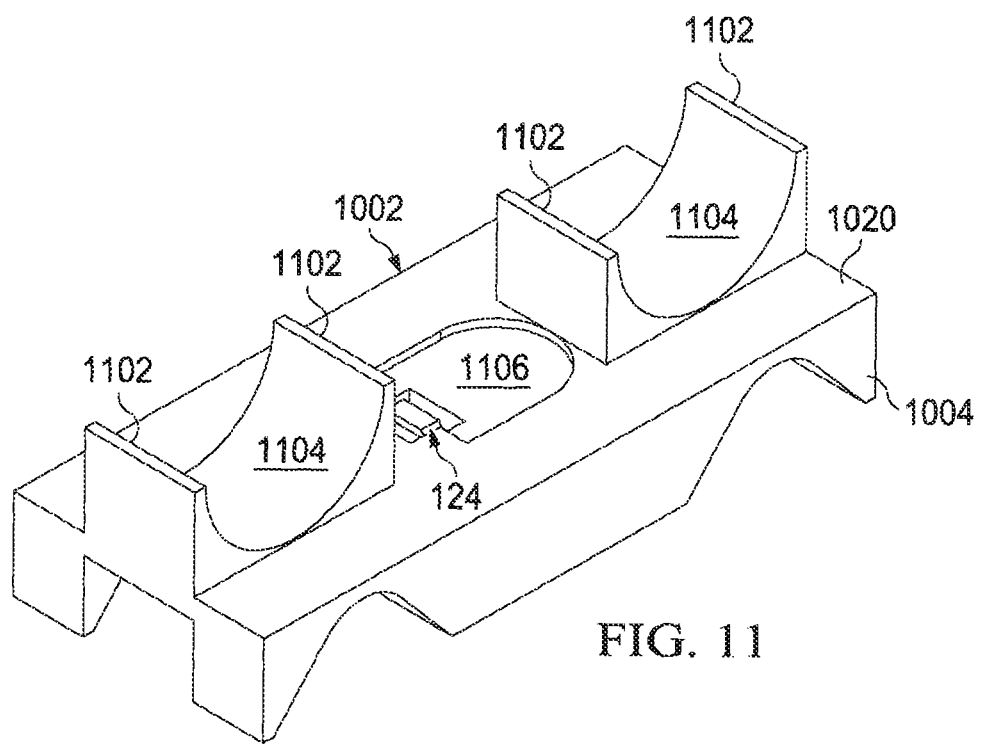
FIG. 11 is a perspective view of the rearward side of the flange of FIG. 10.
Figure 12:
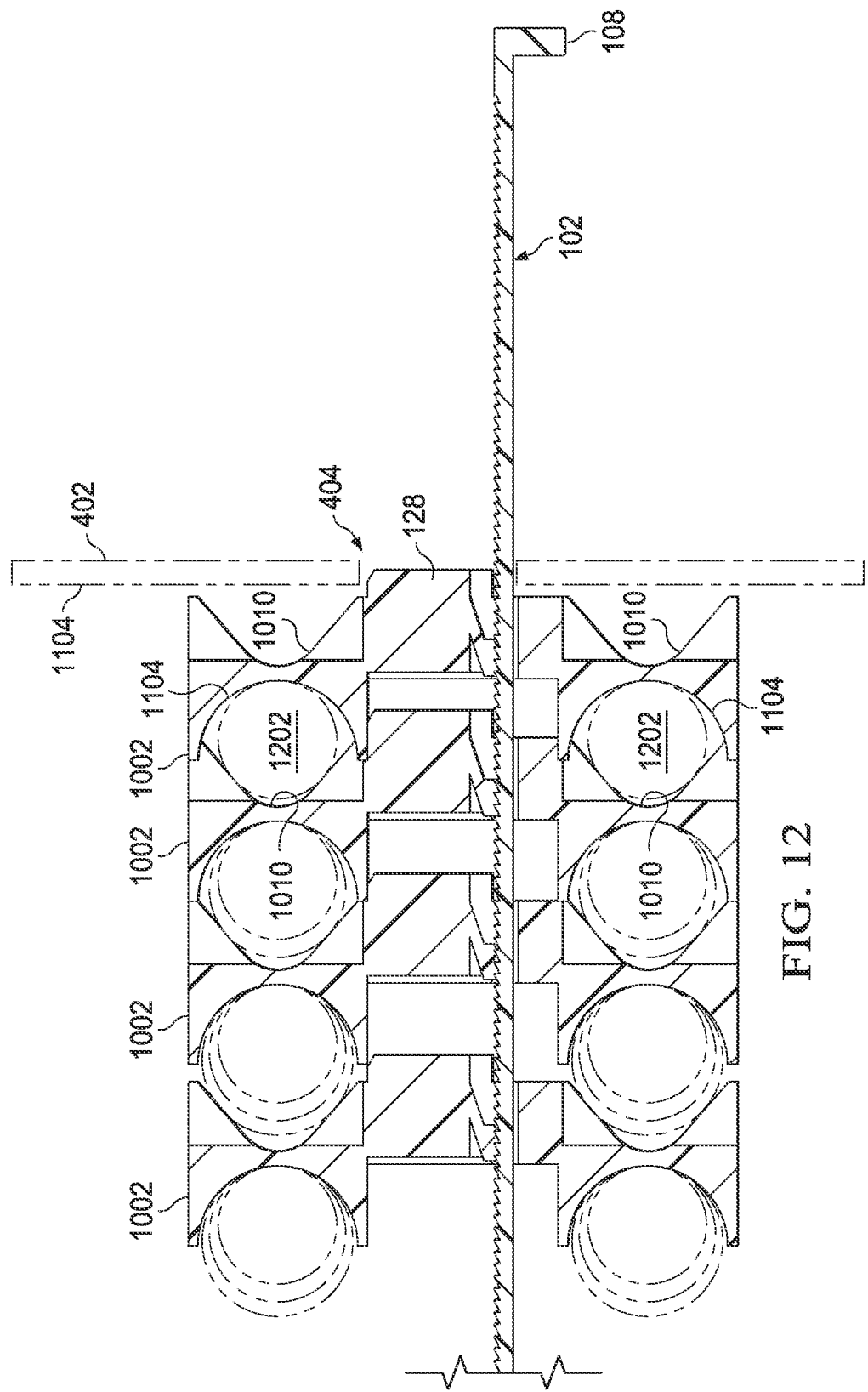
FIG. 12 is a side cutaway view of the installation of the high strength blind installation retainer system of FIG. 10.

Referring now to FIG. 10, a perspective view of a retainer 1002 associated with another embodiment of a high strength blind installation retainer system according to aspects of the present disclosure is shown. FIG. 11 provides a perspective view of the rearward side of the retainer 1002 of FIG. 10. Finally, FIG. 12 is a side cutaway view of the installation of the high strength blind installation retainer system 1200 associated with the retainer of FIGS. 10 and 11.

As with previous embodiments, the retainer 1002 provides an extension post 128 that may be utilized in conjunction with a strap 102 to allow for blind installation of the system 1200 through a wall 402 with an opening 404. In the present embodiment, a number of retainers 1002 may be stacked and/or affixed to a single strap 1002 in a cooperating relationship as shown in FIG. 12. The retainer 1002 provides a flange 1004 surrounding the primary ratcheting receiver 124 that has frontward side 1006 (shown in FIG. 10) that is mounted toward the wall 400. A rearward side 1020 (shown in FIG. 11) faces away from the wall 400.

The frontward side 1006 of the flange 1004 provides one or more recesses 1010. Although two recesses are shown in the present embodiment, it is understood that the retainer 1002 could have more or fewer. The recesses 1010 are utilized to aid in retaining wires, hoses, conduits, or other loads to be secured against the wall 400. On the rearward side 1020, walls 1104 protrude to define one or more recesses 1104. The forward side 1006 provides one or more clearance gaps 1012 to accommodate the walls 1102 when the retainer 1002 is stacked against an adjacent retainer as shown in FIG. 12. A space 1202 is created when the retainer 1002 is stacked adjacent to another retainer. This space may be most readily appreciated with reference to FIG. 12. The recess 1104 cooperates with an adjacent recess 1010 to provide a secure passageway or mounting point for a load to be affixed to the wall 402.

Since each retainer 1002 utilized with the system 1200 provides a ratcheting receiver 124, each of the retainers 1002 will be affixed in a substantially unmovable relationship along the strap 102. The forward most retainers provide the extension post 128 extending through and occupying a substantial part of the opening 404 that is not occupied by the strap 102 as previously described. Whatever loads are needed to be affixed to the wall 404 may be placed in the associated spaces 1202 and then each of the retainers 1002 may be placed on the strap 102 before the strap is withdrawn in the direction of Arrow D as shown in FIG. 12.

Upon installation as shown in FIG. 12, the set of retainers 1002 of the system 1200 will have a nested relationship with respect to the retainers and affixed to the wall 402. A depression 1106 may be defined in the rearward side 1020 of the retainer 1002 to provide at least partial clearance for the adjacent extension post 128 of an adjacent retainer. The cooperation of the walls 1102 nested into the clearance gaps of an adjacent retainer will further stabilize adjacent retainers 1020 relative to one another.

As in previous embodiments, any excess length of strap 102 may be cut away and discarded. It may also be left in place to allow addition or more retainers 1002 which would create additional securement locations. It can be seen from FIG. 12 that, in the case of the foremost retainer 1002, the recesses 1010 may create an additional mounting point for loads to be placed against the wall 402. It will also be appreciated that the spaces 1202 may be sized to accommodate a large variation in loads. If a large line or conduit is secured in one of the spaces 1202 the walls 1102 need not necessarily be fully nested into adjacent recesses 1012.

Figure 13:
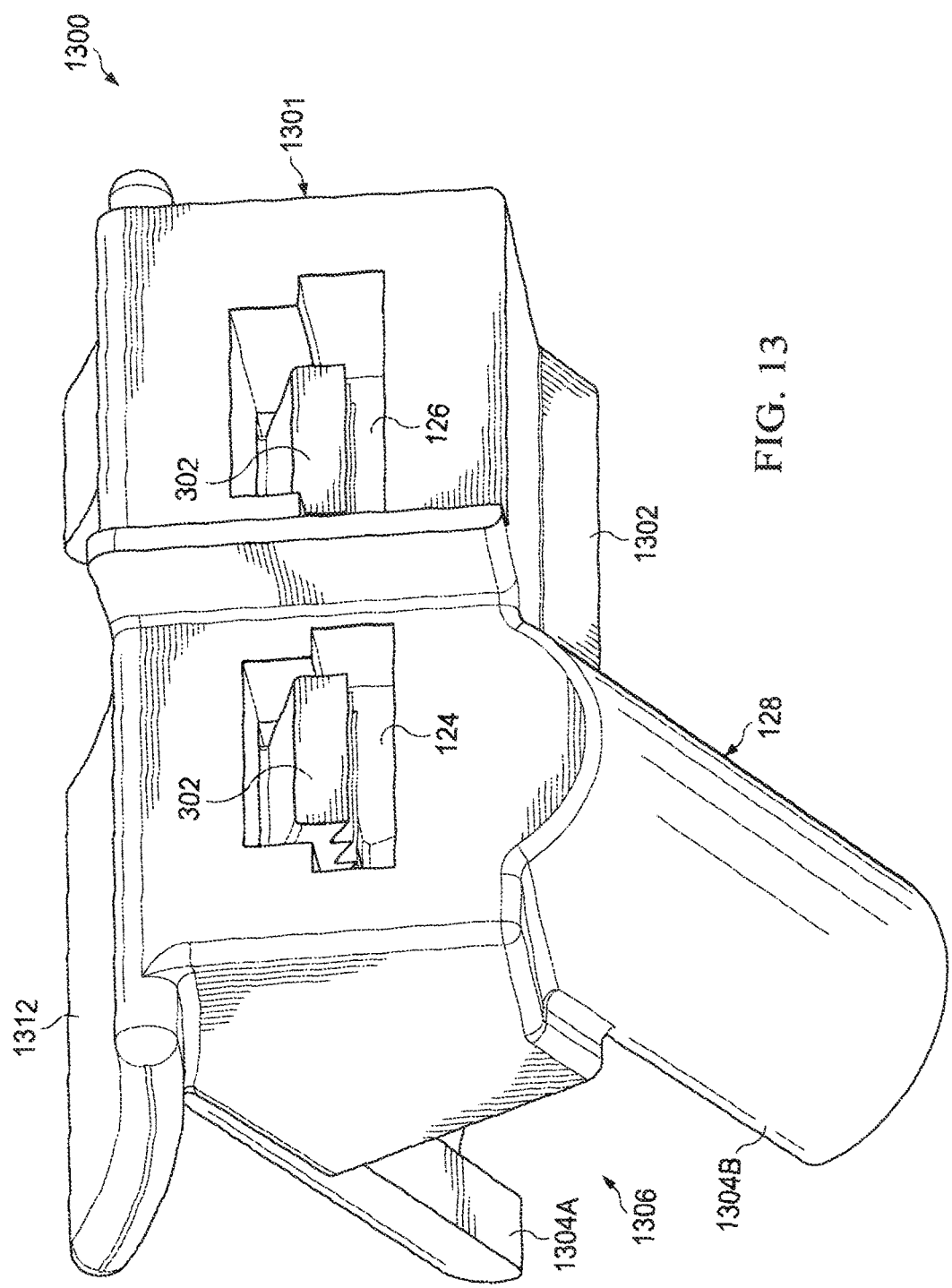
FIG. 13 is a perspective view of another embodiment of a high strength blind installation retainer system according to aspects of the present disclosure.
Figure 14:
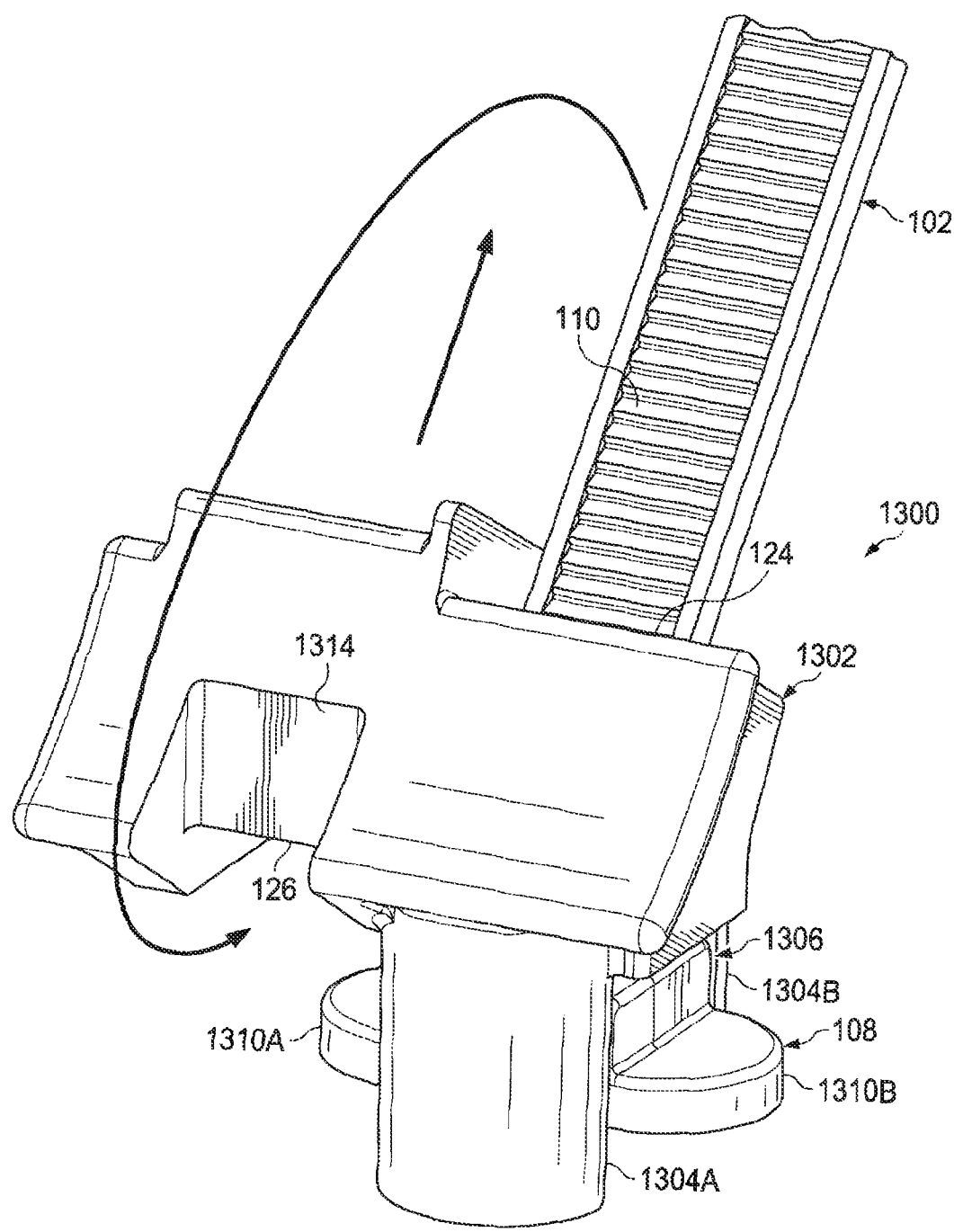
FIG. 14 is another perspective view of the system of FIG. 13.

Referring now to FIG. 13, a perspective view of another embodiment of a high strength blind installation retainer system according to aspects of the present disclosure is shown. FIG. 14 is another perspective view of the system of FIG. 13 from the opposite side and including strap 102. The system 1300 can be seen to comprise both the strap 102 and a retainer 1301. The retainer 1301, as with previous embodiments, comprises a ratcheting receiver 124 surrounded by a flange 1302. The ratcheting receiver 124 provides a pawl 302 that interfits with teeth 110 on the strap 102 in order to allow the strap 102 to slide through the ratcheting receiver in only a single direction. In the present embodiments, the configuration of the strap 102 and receiver 124 are such that the strap may be pulled through the receiver in a direction such that the shank 108 is urged closer to the receiver but cannot be drawn away.

Figure 15:
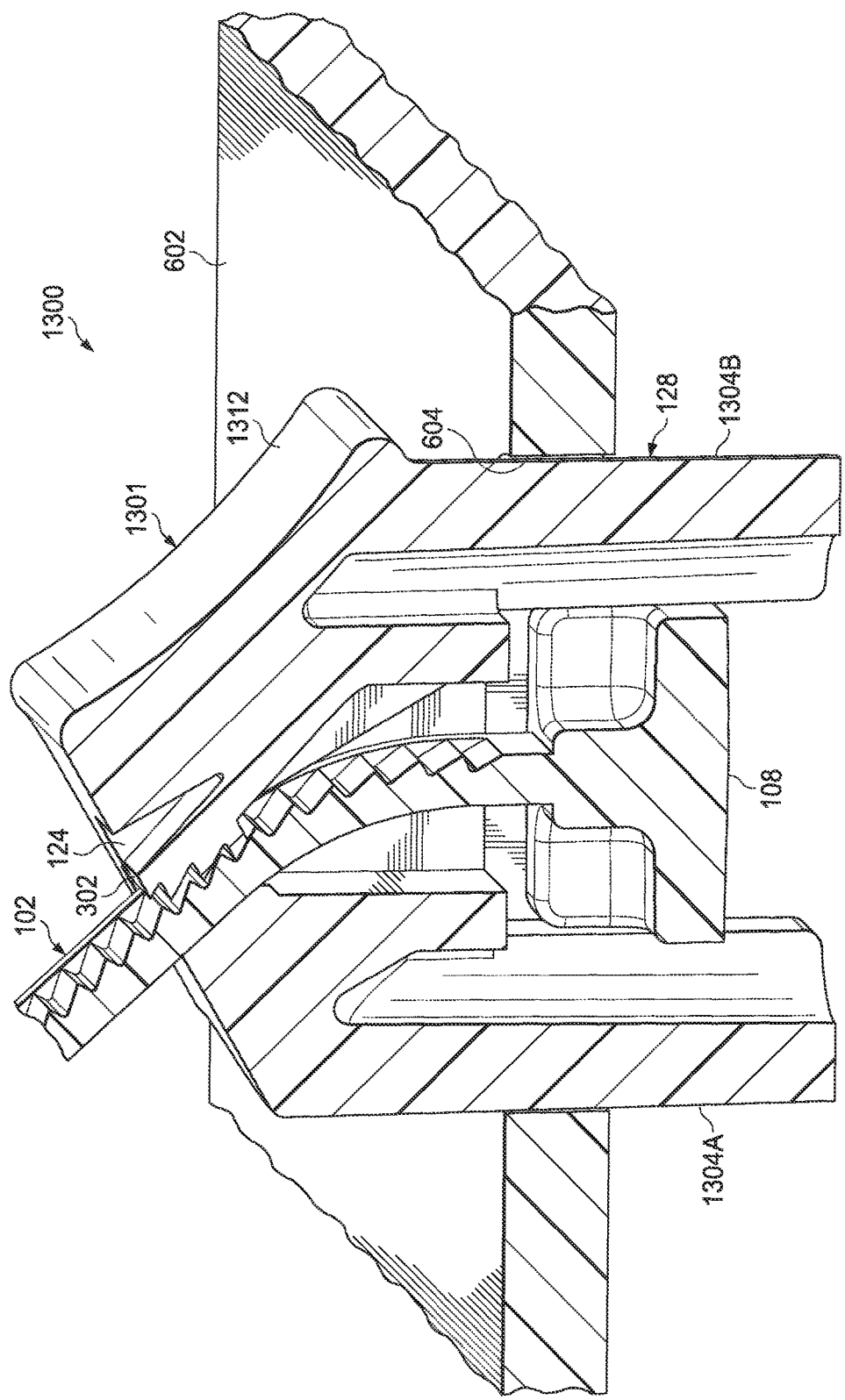
FIG. 15 is a side cutaway view of the system of FIG. 13 being installed into an opening.

In the present embodiment, the receiver 124 is again backed by a post 128. In the present embodiment, the post 128 comprises two halves or post segments 1304A, 1304B. The segments 1304A, 1304B are separated to define a cleft or gap 1306. The segments 1304A, 1304B may be generally semi-cylindrical in shape such that when separated by cleft 1306 they will still fit easily, when properly oriented, into an oblong opening (e.g., such as opening 602 of FIG. 6 discussed above or FIG. 15 discussed below).

The strap 102 passes through the cleft 1306 and into the ratcheting receiver 124 when the strap 102 is pulled away from the retainer 1301. The cleft 1306 may be wide enough to accommodate at least a portion of the shank 108. In the present embodiment, the shank 108 provides two lateral protrusions 1310A, 1310B. The receiver 124 may be oriented with respect to the post segments 1304A, 1304B such that the protrusions 1310A, 1310B are retained in a position offset approximately 90 degrees from the post segments 1304A, 1304B as the shank 108 is drawn to the post 128. The protrusions 1310A, 1310B held in such a position may extend beyond the lateral bounds of the cleft 1306 and or the post segments 1304A, 1304B. The protrusions 1304A, 1304B may also be shaped to match, or approximately match, the outside lateral dimensions of the post segments 1304A, 1304B when separated by cleft 1306. In other words, the protrusions 1304A, 1304B, will fit through the same sized opening as the post 128 when rotated 90 degrees.

With further reference now to FIGS. 15-16, in the configuration described above (and shown throughout FIGS. 13-16), both the shank 108 and the post 128 may fit through the same size and configuration of opening (e.g., an oblong opening 604) but not at the same time. The shank 108 may be fitted through the opening 604 before it is drawn in toward the ratcheting receiver 124. The retainer 1301 (and strap 102, and shank 108) may then be rotated approximately 90 degrees and the shank 128 inserted into the opening 604. With the shank 108 passed through the opening 604 and the post 128 inserted into the same opening, the shank 108 may be drawn tight toward the ratcheting receiver 124. The protrusions 1310A, 1310B will be pressed against the wall 602 on an opposite side from the flange 1302. Thus the retainer system 1300 becomes securely fastened to the wall 602 while only requiring access to the opening 604 and one side of the wall 602.

The retainer 1301 also maintains its rotational position with respect to the wall 602 and opening 604 due to the oblong opening and the separated post segments 1304A, 1304B occupying opposite ends of the opening 604. Moreover, the shank 108 now occupying at least a portion of the cleft or gap 1306 reduces or eliminates the likelihood that, even under substantial load, the retainer 1301 can shift or rotate. Stated differently, the retainer 1301 does not shift or rotate, even under substantial load. The shank 108 being in the center of the post 128 also makes the retainer 1301 less affected by direction of loading.

Figure 16:
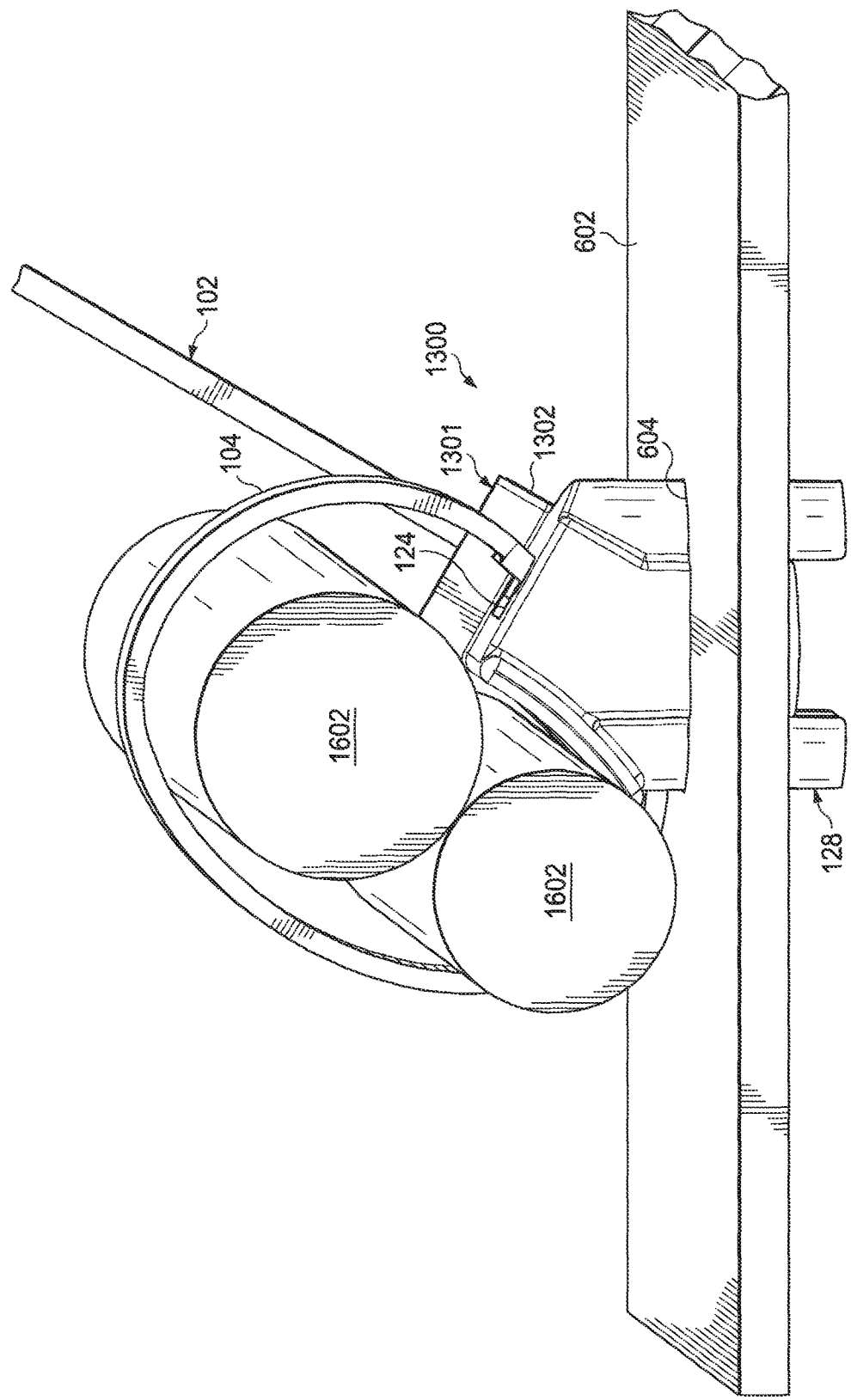
FIG. 16 is a perspective view of the installed system of FIG. 13.

Reference back now to FIG. 14 illustrates clearly a load or cable pad 1312, which may be molded as part of the flange 1302. The pad 1312 may have a dished or depressed profile in order to further stabilize a load or cable. The same strap 102 used to secure the retainer 1301 and flange 1302 to the wall 602 by retraction of the shank 108 to the primary ratcheting receiver 124 may also be used to secure cabling or other loads. The free end 106 (see e.g., FIG. 1) of the strap 110 may be wrapped around a cable or other load in proximity to the retainer 1301 and then inserted into the secondary ratcheting receiver 126. With the strap 102 surrounding the load, it can be pulled tightly through the secondary ratcheting receiver which will retain the cable or load 1602 as shown in FIG. 16. FIG. 16 shows two cables 1602 retained on the wall 602 by the retainer system 1300, although more or fewer loads can be secured by the system 1300.

It will be appreciated that the system 1300, as well as those previously described (e.g., system 100 as shown in FIGS. 1-9), allows the benefit of using a single strap 102 to both secure the retainer system to its deployed location (e.g., on wall 602) and to secure the load or cable to the retainer via one or more secondary ratcheting receivers 126. In the embodiments of FIGS. 1-9, the primary ratcheting receiver 124 operates in a direction that may be said to be orthogonal to the operating direction of secondary ratcheting receivers 126. However, in the system 1300, the primary ratcheting receiver operates in substantially the same direction (e.g., parallel to) the secondary ratcheting receiver 126.

Since the flange 1302 may be secured tightly against a wall when the system 1300 is affixed in place, a relief 1314 may be cut or molded into the cable pad 1312 or other portion of the flange 1302 in order to facilitate insertion of the strap 102 into and through the secondary ratcheting receiver 126. As can be seen in FIGS. 13-16, the primary and secondary ratcheting receivers provide an exit path for the inserted strap 102 that is on approximately the same plane. However, the entry point of the strap 102 is from below the flange 1301 in the case of primary ratcheting receiver 124 and from a side of the flange 1301 in the case of secondary ratcheting receiver 126. The angle of ratcheting receivers 124, 126 relative to the surface of the wall 602 may be chosen to accommodate either entry path with the same exit angle from both ratcheting receivers 124, 126. In various embodiments, this may range from about 30 degrees to about 60 degrees from the plane of the wall 602 (or the direction of the extension post 128). Of course, adjusting the angle for greater accommodation of the primary ratcheting receiver 124 may cause greater difficulty in accessing secondary ratcheting receiver 126 and vice versa. To some extent, the relief 1314 can aid in accessing the secondary ratcheting receiver 126 but too large of a cutout may decrease the strength of the flange 1302 and, accordingly, the utility of the system 1300. The angles of the ratcheting receivers 124, 126 each could be made different, but at the cost of increased complexity in molding and/or tooling and machining.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:

1. An attachment system comprising:
a strap having a shank and a free end interposed by a medial portion;
a retainer having a first ratcheting receiver that engages the strap in a one way ratcheting relationship allowing the free end of the strap to be passed through the first ratcheting receiver and the shank to be thereby pulled toward the first ratcheting receiver but not drawn away therefrom, and wherein the first ratcheting receiver backs an extension post protruding from the retainer such that the shank is sized to pass through an opening in a wall but is prevented from being withdrawn from the opening when the retainer is urged against the wall such that the extension post occupies at least a portion of the opening; and
a second ratcheting receiver affixed to the retainer that receives the free end of the strap for securing a load to the retainer after the shank has been urged toward the first ratcheting receiver to secure the retainer to the wall;
wherein the first and second ratcheting receivers each includes an internal pawl that abuts the medial portion of the strap when inserted therein and allows slippage of the strap in only one direction.

2. The system of claim 1, wherein the first ratcheting receiver and the second ratcheting receiver operate in substantially the same direction.

3. The system of claim 1, wherein the second ratcheting receiver is defined passing through a flange surrounding the first ratcheting receiver.

4. The system of claim 3, wherein the flange provides a cable pad for locating a load to be secured by the strap.

5. The system of claim 4, wherein a relief is defined in the cable pad to allow the strap to pass from the first ratcheting receiver to the second ratcheting receiver.

6. The system of claim 1, wherein the extension post comprises two post segments separated by a cleft.

7. The system of claim 6, wherein the first ratcheting receiver is located such that the shank is drawn into the cleft between the post when the strap is drawn through the first ratcheting receiver.

8. The system of claim 7, wherein the shank comprises a pair of lateral protrusions facing opposite directions between the post segments.

* * * * *